(No Model.)
E. G. VAN ZANDT.
PNEUMATIC TIRE.
No. 595,422.           Patented Dec. 14, 1897.
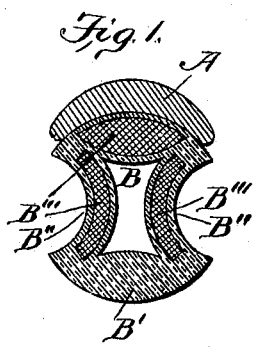
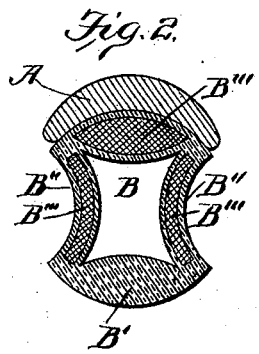
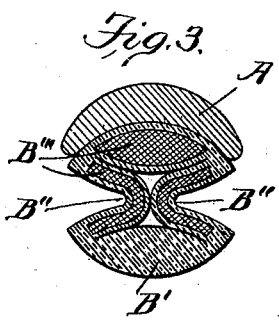
Witnesses:
G. A. Pennington
F. R. Cornwall
Inventor:
E. G. Van Zandt
by Paul Bakewell
his atty
THE NORRIS PETERS CO., PHOTO-LITHO., WASHINGTON, D. C.

UNITED STATES PATENT OFFICE.

EDWIN G. VAN ZANDT, OF ST. LOUIS, MISSOURI, ASSIGNOR TO F. E. NIESEN, TRUSTEE, OF SAME PLACE.

PNEUMATIC TIRE.

SPECIFICATION forming part of Letters Patent No. 595,422, dated December 14, 1897.

Application filed April 29, 1897. Serial No. 634,361. (No model.)

*To all whom it may concern:*

Be it known that I, EDWIN G. VAN ZANDT, a citizen of the United States, residing at the city of St. Louis, State of Missouri, have made a certain new and useful Improvement in Pneumatic Tires, of which the following is a full, clear, and exact description, reference being had to the accompanying drawings, forming a part of this specification, wherein—

Figure 1 is a cross-sectional view through my improved pneumatic tire. Fig. 2 is a similar view of a tire embodying my new principle, the proportions being slightly modified. Fig. 3 is a view showing the position the tire assumes under the weight of the wheel when punctured.

This invention relates to a new and useful improvement in pneumatic tires, the object being to produce a tire of the character above described with concaved sides, whereby when the tire rides over an uneven surface or strikes a stone or projection in its path the sides will tend to move toward each other against the resistance of the contained compressed air within the tire, thereby further compressing the contained air and giving fuller benefit of the pneumatic cushion over the present form of tire, where the contained compressed air is simply displaced when the sides bulge outwardly, as they do in the form of tire now in general use.

With the foregoing object in view my present invention consists in the construction, arrangement, and combination of parts, all as will hereinafter be described, and afterward set forth in the claims.

In the drawings, A indicates the rim of a wheel, and B the tire. The tire is formed with a thickened tread B', preferably as shown, although I am aware that the same may be changed slightly—for instance, flattened on its periphery and otherwise modified—while the sides of the tire are reduced somewhat in thickness and concaved, as at B''.

B''' indicates a suitable strengthening fabric embedded in the sides and seat portion of the tire. This fabric may be of any suitable material such as is usually employed in the manufacture of pneumatic tires, the same forming no part of my present invention.

A tire constructed according to my invention may be ridden at any suitable pressure as the rider may elect, but preferably at a low pressure of air, or, as will readily be understood by those skilled in the art of cycling, "soft" rather than "hard."

Should the tire strike a stone or other projection which may happen to lie within its path, the sides, owing to their inward curve, will move toward each other against the contained compressed air and serve as compressors to further compress the contained air, and thereby give a fuller benefit of the pneumatic cushion than were the sides to bulge outwardly; also, by reason of the sides moving inward they are protected from being cut by contacting with broken glass or other debris which may happen to be lying about.

A tire constructed as shown in the drawings if punctured to such an extent as to allow the air to escape may be ridden without injury to the wheel rim or tire. The position the tire assumes when punctured is shown clearly in Fig. 3, where it will be seen that the sides move inwardly, and, as above stated, are protected from injury.

I am aware that I am not the first to produce a tire which may be ridden when punctured without injury to the wheel rim or tire; but I do claim to be the first to conceive the idea of protecting the sides, as herein set forth.

I am also aware that minor changes in the construction, arrangement, and combination of the several parts of my improved tire may be made and substituted for those herein shown and described without in the least departing from the nature and principle of my invention.

Having thus described my invention, what I claim, and desire to secure by Letters Patent, is—

1. A tire for bicycles or other vehicles, the same comprising a base portion adapted to fit in a concaved rim, a tread portion, and inwardly-curved side walls which move inwardly toward each other when the tread portion is pressed inwardly by contact with the ground; substantially as described.

2. The combination with a concaved rim A, of a tire B having a base portion fitting in the concavity of said rim, a tread B', and side walls B" which are curved inwardly, said curved portions being regularly curved from the tread to the base portion; substantially as described.

In testimony whereof I hereunto affix my signature, in presence of two witnesses, this 21st day of April, 1897.

EDWIN G. VAN ZANDT.

Witnesses:
 D. C. SPRAKER,
 NELLIE MOULDER.